United States Patent
Peterson et al.

[15] 3,696,679
[45] Oct. 10, 1972

[54] THAW SENSOR

[72] Inventors: Victor S. Peterson, 2701 Lynn Drive, Sandusky, Ohio 44870; Arthur J. Gnecco, 91 Edison Drive, Milan, Ohio 44846

[22] Filed: Dec. 30, 1970

[21] Appl. No.: 102,751

[52] U.S. Cl.............73/358, 116/114.5, 324/34 TE, 324/51
[51] Int. Cl............................................G01k 11/06
[58] Field of Search............73/358, 356; 99/192 TT; 340/232; 324/51, 34 TE; 62/125, 128; 200/61.04; 116/114.5

[56] References Cited

UNITED STATES PATENTS

| | | | |
|---|---|---|---|
| 2,966,261 | 12/1960 | Bradbury | 73/358 X |
| 1,623,666 | 4/1927 | Ferkel | 73/356 |
| 2,970,257 | 1/1961 | Hamft et al. | 324/51 |
| 1,917,048 | 7/1933 | Midgley, Jr. | 73/358 X |

FOREIGN PATENTS OR APPLICATIONS 28,667   12/1912   Great Britain..........73/343 R Primary Examiner—Louis R. Prince
Assistant Examiner—Daniel M. Yasich
Attorney—Owen & Owen

[57] ABSTRACT

An improved method and device for determining if a frozen article has been thawed or has exceeded a predetermined temperature during storage or transit. A resilient electrical conductor shaped in the general form of a loop is frozen in a mass of material such that the loop is stressed. The frozen mass and conductor are stored with the frozen article. When the mass of material is thawed, the stressed loop relaxes to change electrical states either from an open circuit to a shorted circuit or from a shorted circuit to an open circuit. The changed state is maintained, even though the article may be refrozen. A shorted turn tester is used to determine the electrical state of the loop, thereby indicating if the frozen article has been thawed.

10 Claims, 9 Drawing Figures

PATENTED OCT 10 1972
3,696,679
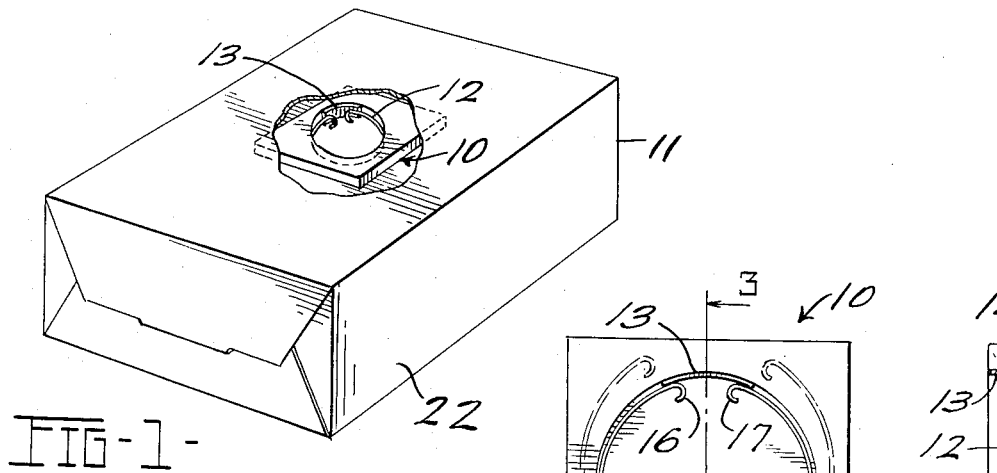
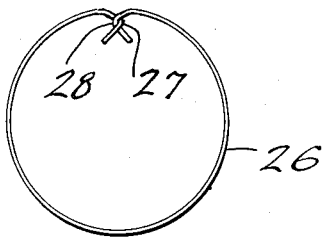
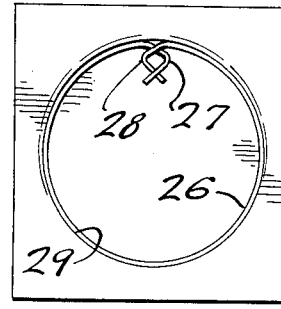
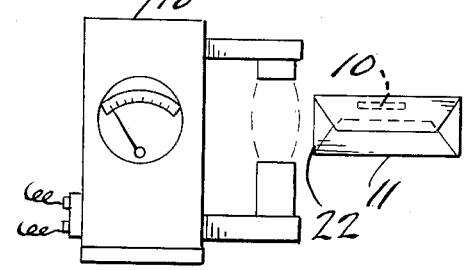
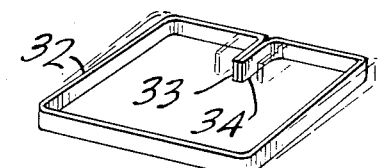
INVENTORS:
VICTOR S. PETERSON,
ARTHUR J. GNECCO.
BY
*Owen & Owen*
ATT'YS.

THAW SENSOR

BACKGROUND OF THE INVENTION

This invention relates to condition sensing and more particularly to an improved method and device for determining if a frozen food article has been thawed.

In recent years, freezing has become of increasing importance to the food industry for storage and shipment of perishable food items such as meat and fish. When fish, for example, is caught on the high seas, it is often frozen and maintained in a frozen condition until sold to the final consumer. Other meats, such as pork or poultry, may be frozen by the packer and shipped to a retailer in a frozen state. It is important that food items of this type are maintained in a frozen state. There is an ever present danger that consumers will be poisoned from foods of this type if they are allowed to thaw and are subsequently refrozen. Pork products, fish and poultry other than waterfowl fall within this class When these foods are thawed and refrozen, bacteria may produce an endotoxin which is thermostable and, therefore, not destroyed by cooking. The endotoxins may be produced in a very short time: in some cases, they may be produced when the food item is only partially thawed. Each year there are numerous cases of people being poisoned by endotoxins produced when food was allowed to thaw and was subsequently refrozen.

For food items which can be refrozen, it is sometimes desirable to determine if the food item has been refrozen to determine the freshness of the item. It may also be desirable to determine the thermal history of other refrigerated or frozen materials. Some highly perishable medicines, for example, rapidly deteriorate at room temperature and, therefore, must be refrigerated. It is desirable to determine if such medicines have exceeded a predetermined temperature during storage and transit.

To date, there has been no satisfactory way for determining if frozen food has been allowed to thaw or partially thaw and has been subsequently refrozen or to determine if an article has exceeded a predetermined temperature. In some cases, such as with some fish, the flesh may change color or becomes soft if the food has been allowed to thaw during storage or transit. However, this indication is not always present. Furthermore, it has always been necessary to open the package in attempting to determine if the frozen food item has been allowed to thaw.

SUMMARY OF THE INVENTION

According to the present invention, an improved method and device are provided for determining if frozen food items have been allowed to thaw or to exceed a predetermined temperature. The device includes an electrical conductor frozen in a mass of material which thaws at or slightly below the thawing temperature of the food items or at the predetermined temperature. The mass of frozen material may, for example, be water, a water-saturated sponge or other materials having a desired melting temperature. If the material is one which will adversely affect the food, it may be sealed in a plastic pouch. The conductor is of a resilent material and is formed in the general shape of a loop. The conductor is stressed to form either an electrically open or an electrically shorted loop and placed in the frozen mass of material. If the mass of material is allowed to thaw, the conductor relaxes towards an unstressed condition, changing the electrical characteristics of the loop to either a shorted or an open loop. The changed electrical characteristics of the conductor remain, even though the mass of material is refrozen.

This device is designed for packaging with the frozen or refrigerated item. If the frozen item is allowed to thaw or if the refrigerated item exceeds a predetermined temperature, the frozen mass of material will also thaw, allowing the loop to change its electrical state. The sealed package may subsequently be brought near the pickup probe of a shorted turn tester. The shorted turn tester indicates the presence of a shorted turn or loop within several inches of a pickup. Thus, it can be determined if the frozen mass of material has been allowed to thaw without opening the package. In addition, the package may be opened and the condition of the device may be visually determined. This permits the final consumer to determine the condition of food prior to consumption without the need of a shorted turn tester.

Accordingly, it is preferred object of the invention to provide an improved method and device for determining if frozen food items have been thawed during storage and transit.

It is another object of the invention to provide an improved method and device for determining if an article has exceeded a predetermined temperature.

Other objects and advantages of the invention will become apparent from the following detailed description, reference being made to the accompanying drawings.

BRIEF DESCRIPTION OF THE DRAWINGS

FIG. 1 is a perspective view of a package including a thaw sensing device according to the present invention;

FIG. 2 is a plan view of a thaw sensing device according to the present invention;

FIG. 3 is a cross-sectional view taken along line 3—3 of FIG. 2;

FIG. 4 is a plan view of the elastic wire loop from the device of FIG. 2;

FIG. 5 is a view in perspective of the shorting member from the device of FIG. 2;

FIG. 6 is an elevational view showing a package being tested;

FIG. 7 is a plan view of a modified elastic wire loop;

FIG. 8 is a plan view of a modified device including the wire loop of FIG. 7; and FIG. 9 is a perspective view of another modified conductive loop.

DESCRIPTION OF THE PREFERRED EMBODIMENTS

Referring now to FIG. 1, an improved thaw sensing device 10 according to the present invention is shown positioned within a package 11 which may be a frozen food package. The device 10 may be located outside the package 11, but is preferably located within the package 11 where it will not be affected by exposure of the package 11 to warm air for short durations. A single device 10 may be located in a large shipping carton containing several smaller packages, or a device 10 may be located in each of a plurality of smaller, consumer sized packages. In any event, the device 10 must be located such that it is exposed to the same thermal environment to which the package 11 is exposed.

Turning to FIGS. 2–5, the thaw sensing device 10 is shown in detail. The device 10 generally comprises a conducting wire loop 12 and a shorting member 13 frozen in a mass of material 14. The material 14 may simply comprise a block of ice shaped to define a cavity 15. After the block of ice 14 is shaped, the wire loop 12 is stressed by compressing and is inserted into the cavity. The shorting member 13 is then inserted into the cavity to electrically connect end portions 16 and 17 of the loop 12. The loop 12 is shown in its natural position in FIG. 4 and in dashed lines in FIG. 2, while the shorting member 13 is shown in FIG. 5. The shorting member 13 is preferably formed from a flat piece of conducting material to distribute stresses from the ends 16 and 17 of the loop 12 and to ensure a good electrical connection. The member 13 prevents the ends 16 and 17 from creeping into the frozen material 14, eventually breaking the electrical connections between the ends 16 and 17.

The block of frozen material 14 may consist of liquids other than water. If, for example, it is desired to indicate that the package 11 has exceeded a predetermined temperature less than 32° F., the material 14 may comprise a mixture of water and an alcohol or a salt to give the predetermined lower melting temperature. Or, the material 14 may be wax or some other material having a melting temperature above 32° F. If the material 14 is of a type which will adversely affect the contents of the package 11, the device 10 may be sealed in a plastic pouch (not shown). In a modified form, the material 14 may comprise a soft sponge saturated with a liquid having the predetermined melting temperature. The sponge may be formed to define the cavity 15 prior to saturation with the liquid and freezing. The material 14 may also be frozen about the loop 12. A tool having smooth tapered surfaces is used to hold the loop 12 in a compressed state while the material 14 is frozen and is subsequently removed from the frozen material 14.

The cavity 15 may be filled with liquid and frozen after the wire loop 12 is inserted, although this is not necessary. The size of the mass of material 14 determines the time required for the material 14 to melt to a point where the loop 12 expands to an open circuit condition. By filling the cavity 15 with frozen material, this time is increased.

Referring now to FIG. 6, the package 11 is shown being tested by a shorted turn tester 18. The shorted turn tester 18 is a commercially available device which indicates when a shorted turn of wire is brought close to an electromagnetic field in a gap 19 between a pair of probes 20 and 21. A typical commercial tester of this type is the Norma Shorted Turns Tester No. 134 sold by the Freed Transformer Company, Inc. of Brooklyn, New York. This device is sufficiently sensitive to indicate when a shorted one inch diameter turn of wire is located within three to four inches from the gap 19. Thus, if the device 10 is positioned within three to four inches from the edge of a surface 22 of the package 11, the tester 18 will indicate the electrical condition of the loop 12 without opening the package 11.

Referring now to FIGS. 7 and 8, a modified device 25 is shown. A wire loop 26 is formed with hooked end portions 27 and 28. The loop 26 is formed from a resilient material, such as piano wire, and is prestressed such that the hooked end portions 27 and 28 are normally urged into electrical contact with each other, as shown in FIG. 7. The loop 26 is compressed and inserted into a cavity 29 in a mass of frozen material 30 such that the ends 27 and 28 are spaced apart, forming an open circuit. When the mass of frozen material 30 is thawed, the loop 26 relaxes until the ends 27 and 28 are again in contact, forming a shorted loop. Thus, thawing is indicated by a short in the embodiment of FIGS. 7 and 8, while it is indicated by an open circuit in the embodiment of FIGS. 2–5.

Referring now to Fig. 9, still a third embodiment of a loop 32 is shown. The loop 32 is constructed from a flat piece of resilient, electrically conductive material. The loop 32 is shown with a substantially square shape. The shape of the loop is not critical, and may be circular, oval, triangular, rectangular, or irregular, so long as an electrical loop or turn is formed. Constructing the loop 32 from a flat material reduces the chances of creep into the frozen material over long periods of storage near the melting temperature. The loop 32 is provided with a pair of flat end portions 33 and 34 which are resiliently urged into electrical contact with each other. The thaw sensing device is formed by inserting a block of frozen material either within the loop 32 or between the end portions 33 and 34 to break electrical contact between the end portions 33 and 34. When the frozen material is thawed, the end portions 33 and 34 will again come into electrical contact with each other to form a shorted loop.

It will be appreciated that various modifications and changes may be made in the design and shape of the wire loop and in the shape and material used for the frozen mass of material in the thaw sensing device without departing from the spirit and the scope of the claimed invention.

What we claim is:

1. A device for use with means for measuring electrical properties of a coil to determine if an article has exceeded a predetermined temperature comprising, in combination, a mass of frozen material having a melting point at the predetermined temperature, a resilient electrical conductor having ends formed into a normally open loop, said loop being stressed by said mass of material, and means electrically shorting said loop ends when said loop is stressed by said frozen material, said loop ends becoming electrically open through the resiliency of said conductor when said mass of frozen material is thawed.

2. A device for determining if an article has exceeded a predetermined temperature, as defined in claim 1, wherein said material comprises a sponge saturated with water.

3. A device for determining if an article has exceeded a predetermined temperature, as defined in claim 1, wherein said material is water.

4. A device for determining if an article has exceeded a predetermined temperature, as defined in claim 1, wherein said material comprises a mixture of water and an impurity to give the material the predetermined melting temperature.

5. A device for use with means for measuring electrical properties of a coil to determine if an article has exceeded a predetermined temperature comprising, in combination, a mass of frozen material having a melting point at the predetermined temperature, a resilient electrical conductor having ends formed into a normally electrically shorted loop, said loop being stressed by said mass of material, and means maintaining said loop ends electrically separated when said loop is stressed by said frozen material, said loop ends becoming electrically shorted through the resiliency of said conductor when said mass of frozen material is thawed.

6. A device for determining if an article has exceeded a predetermined temperature, as defined in claim 5, wherein said material comprises a sponge saturated with water.

7. A device for determining if an article has exceeded a predetermined temperature, as defined in claim 5, wherein said material is water.

8. A device for determining if an article has exceeded a predetermined temperature, as defined in claim 5, wherein said material comprises a mixture of water and an impurity to give the material the predetermined melting temperature.

9. A method for determining if an article has been heated above a predetermined temperature during storage comprising the steps of: forming a loop of electrically conductive resilient material such that said loop has ends which may be deformed between first and second stressed states, the resiliency of said loop urging said loop ends to said first state wherein said loop ends are electrically shorted together, said loop ends being electrically an open circuit when in said second state; stressing said loop to said second stressed state with a mass of frozen material having a melting point at the predetermined temperature; storing said frozen material and said loop with the article; and measuring if said loop is in said first stressed state or said second stressed state by means of an electromagnetic field.

10. A method for determining if an article has been heated above a predetermined temperature during storage comprising the steps of: forming a loop of electrically conductive resilient material such that said loop has ends which may be deformed between first and second stressed states, the resiliency of said loop urging said loop ends to said first state wherein said loop ends are electrically an open circuit, said loop ends being electrically shorted together when in said second state; stressing said loop to said second stressed state with a mass of frozen material having a melting point at the predetermined temperature; storing said frozen material and said loop with the article; and measuring if said loop is in said first stressed state or said second stressed state by means of an electromagnetic field.

* * * * *